Aug. 13, 1946.       M. LANGE       2,405,701
FLAGSTAFF SUPPORT
Filed Jan. 21, 1944
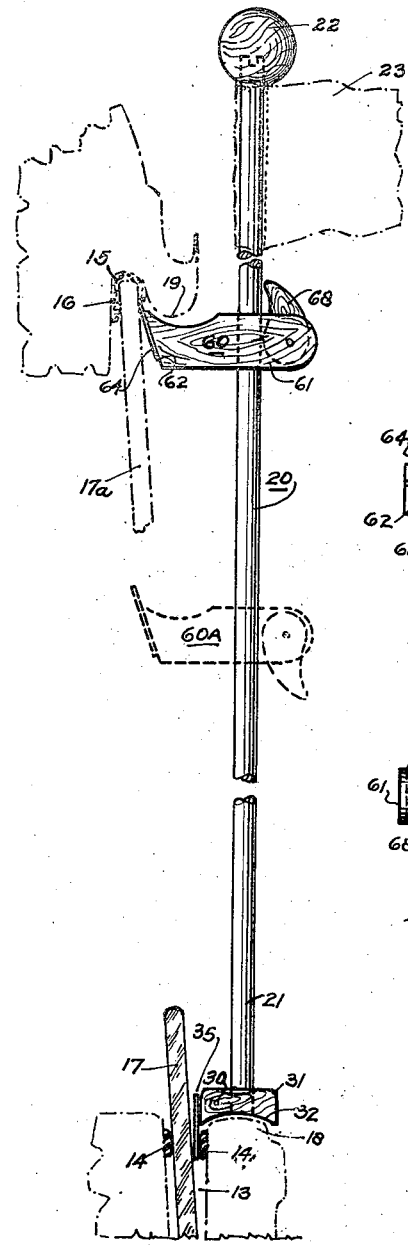
Fig. 1
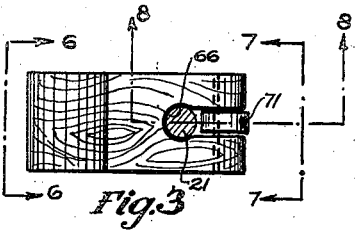
Fig. 3
Fig. 4
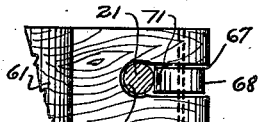
Fig. 5
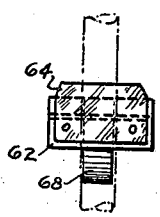
Fig. 6
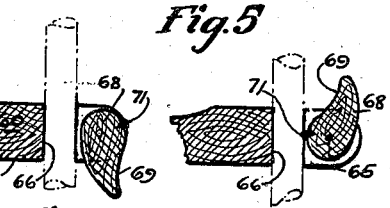
Fig. 7  Fig. 8  Fig. 9
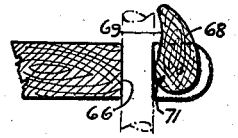
Fig. 10
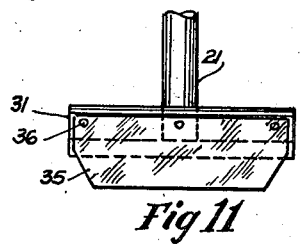
Fig. 11
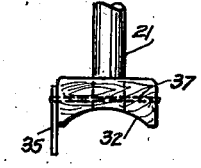
Fig. 12
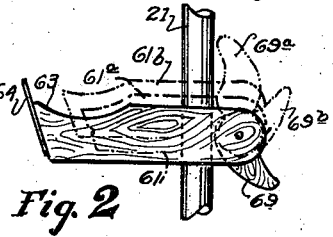
Fig. 2
INVENTOR.
Morris Lange
BY Patented Aug. 13, 1946

2,405,701

UNITED STATES PATENT OFFICE 2,405,701

FLAGSTAFF SUPPORT

Morris Lange, University Heights, Ohio

Application January 21, 1944, Serial No. 519,121

9 Claims. (Cl. 248—43)

This invention relates to flag or banner holders and particularly to the kind used on automobiles.

For a better understanding of this invention, it should be pointed out that automobiles have windows that vary in size and shape and that quite frequently the top frame portions of the windows are not parallel to the lower frame or sill portions. Therefore, prior art flag staff supports are more or less limited for use on only certain makes of automobiles, and are not entirely suited for general use. All closed body type automobiles, however, do have channelled window frames and by constructing the staff member as hereinafter described, so that engagement may be made with these channels, a flag holder having a wider application and universal use, may be had. This instant flag is not apt to fall off of the automobile while in use, and it also makes use of a more direct means for fixing the position of the adjustable arm member on the staff.

It is therefore the primary object of this invention to provide a flag staff support that will fit onto and securely engage the window pane channels of an automobile, without interfering, disturbing or obstructing the normal operation of the window and the mounting of which is entirely independent of the glass pane or its condition or its operation.

Another object is to construct a device of the type mentioned that is quickly and easily mounted and which does not use metal springs or extraneous automatic tensioning devices of any kind.

A further object is to provide a simple and efficient flag holder that is economical to manufacture and use and which will not injure or scratch the automobile body or break or chip the glass window pane.

Still another object is to provide a toggle-like locking device for a support of the kind mentioned, that is positive, quick acting and easy to use.

These and other objects will become apparent from a reading of the following specifications and claims, together with the accompanying drawing, in which like characters refer to and indicate like parts and in which:

Figure 1 is a view of the improved flag staff support mounted on the window of an automobile;

Figure 2 is a side elevation of the movable arm and indicating positions it reaches during the locking operation;

Figure 3 is a top plan view of the movable arm showing the locking cam in the unlocked position;

Figure 4 is a view similar to Figure 3, but showing the arm cam in the toggle position;

Figure 5 is a view similar to the one shown in the Figure 3, but showing the arm cam in the locked position;

Figure 6 is a front end view of the arm taken along the line and in the direction of the arrows 6—6 of the Figure 3;

Figure 7 is a rear end view of the arm taken along the line and in the direction of the arrows 7—7 of the Figure 3;

Figure 8 is a vertical cross sectional view of the arm taken along the line and in the direction of the arrows 8—8 of the Figure 3;

Figure 9 is a vertical cross sectional view of the arm showing the toggle position indicated in the Figure 4;

Figure 10 is a vertical cross sectional view of the arm showing the cam in the locked position of the Figure 5;

Figure 11 is a front view of the fixed base member; and

Figure 12 is a side view of the base member.

The instant invention broadly consists of a staff 20, having a bottom or base member 30 securely mounted thereon and a slidable arm member 60. Each of these parts or members will be described in detail hereinafter and in the order set forth.

The staff member 20 is made of a straight grained resilient wood, such as hickory. It is simply a round rod 21, about twenty-two inches long and about seven-sixteenths of an inch in diameter. At the top end there is removably attached a cloth banner 23 bearing any desired words or indicia. A small ball 22 is removably mounted on the top end to prevent the banner from blowing off in a stiff breeze. The ball 22, referred to in the claims as the banner retaining portion, may be held on by friction, as shown, or may be screwed on, so that the banner 23 may be easily changed or replaced.

The base member 30, is simply a wooden block about four inches long, an inch wide and one-half inch thick. It has a shallow channel 32 running lengthwise from end to end and is made to fit the rounded sill 18 of the automobile window on which it is mounted. While a padding is not shown in the drawing, a soft felt or rubber sheet may be secured to the surface of the channel so that the automobile finish will not be marred or scratched.

This base member 30 has a hole in the center in which the rod 21 securely fits. The rod 21 is secured in the hole with a suitable adhesive and is also retained therein by a laterally extending pin 37, which runs through the body 31 of the base member and also diametrically through the rod 21. In practice, it has been found quite advantageous to rely almost entirely upon the pin 37 for connecting the rod and the base member together. By making the hole in the body 31 slightly larger than the rod 21 and by eliminating the adhesive entirely, the rod is enabled to pivot on the pin and to incline slightly. The body design of most modern automobiles is such that their window sills and top window frame members are not always exactly parallel and the aforementioned pivoting or inclination forms a better and smoother contact with the window. Furthermore, if a non-waterproof adhesive is used to attach the rod 21 and the base member 30 together, the adhesive may dissolve during a rain and the device may become affected thereby.

In order to firmly secure the base member 30 to the automobile, a small apron 35, hereinafter referred to as a flange, is mounted on one of the sides of the base. This apron 35 is simply a piece of sheet plastic, and is fastened to the wood base with a few small tacks 36. A metal sheet might also be used for this purpose. The thickness of the flange material should not be greater than a twenty gauge, nor should it be too thick to easily fit between the window pane and the frame. It should be fairly stiff so that it will slide past the felt or rubber bead 14 touching the glass. It need extend only about one-half inch below the bottom edge of the base member 30.

The arm member 60 is formed of a small block of wood about four inches long, one inch thick and one and one half inches wide. Its forward or free end is shaped as shown and has a concave portion 63, the upper side of which engages the convex bottom surface of the top window frame 19. This concave portion may be, if desired, covered with a pad of some sort to prevent it from scratching the automobile. The extreme front edge 62 is provided with an apron or flange 64, which fits into the channel 15 of the window frame 19. This flange 64 is secured to the arm 60 by small tacks or screws and it should also be thin enough to easily fit between the glass pane when closed, as indicated by the character 17a, and the felt lining 16 in the channel. This flange 64 may be made of the same material as the aforementioned bottom flange 35.

The body or end of the arm adjacent to the rod 21, indicated by the character 61, has a hole 66 through which the staff member 20 may easily slide. In the drawing the alternate position of the arm is indicated by the character 69a. This slidable arm enables the support to be readily mounted on different makes of automobiles or on windows of different size. The body 61 also has a slot 67 therein which receives the hereinafter described cam member 68. This slot 67 extends perpendicularly through the top and bottom surfaces of the arm, opens longitudinally into the hole 66 and extends through the end of the arm body.

The cam member 68 is made of wood and has an eccentric shape somewhat as shown. It is mounted in the aforementioned slot 67 by the pivot pin 65. Its shape is such that when its free or finger portion 69 is turned up, the body of the cam will tightly press the rod 21 when it is in the hole 66 and prevent its movement. When it is turned down the arm may freely move, turn or slide on the rod.

In order to prevent the vibration of the automobile or of the staff from loosening the cam 68, it is provided with a small bump or protuberance 71. Actually, this protuberance 71 is simply the round head of a very small nail or screw. The wood of the rod is relatively soft and resilient and the protuberance 71 is enabled to press therein and allow the cam to operate on either side of a dead-center position and to reach either its locking or unlocking position. In effect, the cam operates as a toggle and is either open or closed. Its open or normal position is indicated in the Figure 2 by the character 69. Its locking, holding or wedging position is indicated by the character 69a and its intermediate or toggle position is indicated by the character 69b.

The cam member 68 is shaped as indicated and when assembled and mounted on the arm 60, the concave portion of the part 69 should be away from the staff member 20 and should face the staff when in the closed or engaging position.

It should be noted that the arm member 60, when being tightened on the rod 21, has a tendency to creep upward on the rod. This is due primarily to the engagement of the protuberance 71 with the rod and to the rolling action of the cam itself. This creeping movement, while relatively slight, further tightens the portion 63 against the window frame and forces the flange 64 up into the channel 15. It also, if the arm member 60 is immediately applied too tightly to the frame, causes the rod 21, to bow outward slightly and make it tense. This tension further secures the device to the automobile.

Among the many advantages of this invention is the outstanding feature that permits it to be mounted entirely from the outside of the vehicle. That is, it is not necessary to enter the automobile to adjust or change the position of the window pane in order to mount the device. Any unskilled person may quickly mount several of the supports safely and without damage; and when it is recalled that flag holders of this type are used primarily by undertakers for funeral processions and where several of them have to be mounted hastily on many different makes and styles of vehicles, some of which are only brought into line the last minute, it becomes apparent why this feature is so important.

It will now be clear that there is provided by this invention a flag staff support which accomplishes the objects set forth. While the invention has been shown and described in its preferred form, it is to be understood that it is not to be considered in a limiting sense as other forms or modifications may also be regarded as being within the scope of the appended claims.

I claim:

1. A flag staff support adapted to be engaged between the sill and the top of an automobile window frame comprising a staff, a base member on the bottom of the staff engageable with the sill, and an arm member slideably mounted on the staff above the base member, the said arm member having a flange thereon engageable with the aforesaid top.

2. A device of the type defined in claim 1 and further characterized by the arm member having a cam means thereon for fixing its position on the staff.

3. A flag staff support adapted to be engaged between the sill and the top of an automobile window frame comprising a staff, a base member on the bottom of the staff and having a flange portion thereon engageable with the aforesaid sill, and an arm member slideably mounted on the staff above the base member.

4. A device of the type defined in claim 3 and further characterized by the arm member having a clamp device thereon for fixing its position on the staff.

5. A flag staff support adapted to be engaged between the sill and the top of an automobile window frame comprising a staff, a base member mounted on the bottom of the staff and having a flange portion thereon engageable with the aforesaid sill, and an arm member slideably mounted on the staff above the base member and having a flange portion thereon engageable with the aforesaid top.

6. A device of the type defined in claim 5 and further characterized by the arm member having a fastening means thereon for fixing its position on the staff.

7. A flag staff support adapted to be engaged between the sill and the top of an automobile window frame comprising a staff, a base member mounted on the bottom of the staff engageable with the sill of the aforesaid window frame, an arm member slideably mounted on the staff above the base member and engageable with the said top, the said arm member having a hole therein through which the staff may slide, a slot opening into the hole, and a cam member mounted in the said slot adjacent to and operable in the said hole and being capable of disengaging the staff when in a first or open position and of engaging the same when in a second or closed position.

8. A flag staff support adapted to be engaged between the sill and the top of an automobile window frame comprising a staff, a base member on the bottom of the staff engageable with the said sill, an arm member slideably mounted on the staff above the base member and engageable with the said top, the said arm member having a hole therein through which a staff may slide, a slot therein opening into the hole, and a cam member mounted on the said arm member adjacent to and operable in the said hole and being capable of disengaging the staff when in a first or open position and of engaging the same when in a second or closed position, the said cam member having a protuberance thereon which when engaged with the staff causes a toggle-like operation and effect whereby the said staff is either tightly held by or is freely slidable through the said arm member.

9. A device of the type defined in claim 8 and further characterized by the said arm member having a flange thereon engageable with the top of the window frame.

MORRIS LANGE.